(12) United States Patent
Chiang et al.

(10) Patent No.: US 10,418,663 B2
(45) Date of Patent: Sep. 17, 2019

(54) METAL-ION BATTERY

(71) Applicant: Industrial Technology Research Institute, Chutung, Hsinchu (TW)

(72) Inventors: Chien-Chih Chiang, New Taipei (TW); Chun-Kai Lin, Toucheng Township, Yilan County (TW); Kuang-Yao Chen, Ji'an Township, Hualien County (TW); Chun-Hsing Wu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 29 days.

(21) Appl. No.: 15/598,102

(22) Filed: May 17, 2017

(65) Prior Publication Data

US 2017/0338514 A1    Nov. 23, 2017

Related U.S. Application Data

(60) Provisional application No. 62/337,629, filed on May 17, 2016.

(30) Foreign Application Priority Data

Dec. 9, 2016  (TW) .............................. 105140794 A

(51) Int. Cl.
*H01M 4/66* (2006.01)
*H01M 4/133* (2010.01)
(Continued)

(52) U.S. Cl.
CPC ....... *H01M 10/0563* (2013.01); *H01M 4/133* (2013.01); *H01M 4/583* (2013.01);
(Continued)

(58) Field of Classification Search
CPC ...... H01M 4/133; H01M 4/583; H01M 4/587; H01M 4/663; H01M 10/054;
(Continued)

(56) References Cited

U.S. PATENT DOCUMENTS 4,463,072 A    7/1984  Gifford et al.
5,474,861 A   12/1995  Bito et al.
(Continued)

FOREIGN PATENT DOCUMENTS

| CN | 101645500 A | 2/2010 |
| CN | 101662020 A | 3/2010 |

(Continued)

OTHER PUBLICATIONS

Taiwanese Office Action and Search Report, dated May 12, 2017, for Taiwanese Application No. 105140794.
(Continued)

*Primary Examiner* — Brittany L Raymond
(74) *Attorney, Agent, or Firm* — Birch, Stewart, Kolasch & Birch, LLP

(57) ABSTRACT

A metal-ion battery are provided. The disclosure provides a metal-ion battery. The metal-ion battery includes a positive electrode; a negative electrode, wherein the negative electrode is a metal or an alloy thereof, the metal is Cu, Fe, Zn, Co, In, Ni, Sn, Cr, La, Y, Ti, Mn, or Mo; a separator, wherein the positive electrode is separated from the negative electrode by the separator; and an electrolyte, disposed between the positive electrode and the negative electrode. The electrolyte includes ionic liquid, aluminum halide.

16 Claims, 4 Drawing Sheets

(51) Int. Cl.
  *H01M 4/583* (2010.01)
  *H01M 10/0563* (2010.01)
  *H01M 10/0568* (2010.01)
  *H01M 10/054* (2010.01)
  *H01M 4/587* (2010.01)

(52) U.S. Cl.
  CPC .......... *H01M 4/587* (2013.01); *H01M 4/663* (2013.01); *H01M 10/054* (2013.01); *H01M 10/0568* (2013.01); *H01M 2300/0045* (2013.01)

(58) Field of Classification Search
  CPC ......... H01M 10/0563; H01M 10/0568; H01M 2300/0045
  See application file for complete search history.

(56) References Cited

U.S. PATENT DOCUMENTS

| | | | |
|---|---|---|---|
| 6,589,692 | B2 | 7/2003 | Takami |
| 8,859,143 | B2 | 10/2014 | Zhamu et al. |
| 2010/0316914 | A1 | 12/2010 | Correia |
| 2012/0082904 | A1 | 4/2012 | Brown et al. |
| 2012/0082905 | A1 | 4/2012 | Brown et al. |
| 2014/0242457 | A1 | 8/2014 | Archer et al. |
| 2015/0249261 | A1* | 9/2015 | Dai .................... H01M 10/054 429/336 |
| 2016/0020485 | A1 | 1/2016 | Liao et al. |
| 2016/0028117 | A1* | 1/2016 | Oh .................... H01M 10/0567 429/337 |

FOREIGN PATENT DOCUMENTS

| | | |
|---|---|---|
| CN | 101764254 A | 6/2010 |
| CN | 101764256 A | 6/2010 |
| CN | 101794907 A | 8/2010 |
| CN | 103254664 A | 8/2013 |
| CN | 103825045 A | 5/2014 |
| CN | 103915611 A | 7/2014 |
| CN | 104025344 A | 9/2014 |
| CN | 104183835 A | 12/2014 |
| CN | 104201350 A | 12/2014 |
| CN | 104241596 A | 12/2014 |
| CN | 104393290 A | 3/2015 |
| CN | 104701541 A | 6/2015 |
| CN | 104810544 A | 7/2015 |
| CN | 104838525 A | 8/2015 |
| CN | 104868179 A | 8/2015 |
| CN | 104952629 A | 9/2015 |
| CN | 104993130 A | 10/2015 |
| CN | 105322229 A | 2/2016 |
| JP | 1-95469 A | 4/1989 |
| JP | 9-120816 A | 4/1989 |
| JP | 2-40868 A | 2/1990 |
| JP | 11-233109 A | 8/1999 |
| JP | 2008-503526 A | 2/2008 |
| JP | 2011-107156 A | 6/2011 |
| JP | 2014-222609 A | 11/2014 |
| JP | 2015-224283 A | 12/2015 |
| KR | 10-2014-0076589 A | 6/2014 |
| TW | 201543733 A | 11/2015 |
| WO | WO 2012/044678 A2 | 4/2012 |
| WO | WO 2013/049097 A1 | 4/2013 |
| WO | WO 2015/131132 A1 | 9/2015 |
| WO | WO 2015/144044 A1 | 10/2015 |

OTHER PUBLICATIONS

Japanese Office Action, dated Apr. 24, 2018, for Japanese Application No. 2017-097886.
Chinese Office Action and Search Report, dated Dec. 29, 2018 for Chinese Application No. 201710347665.3.
Japanese Office Action, dated Oct. 30, 2018, for Japanese Application No. 2017-097886.

* cited by examiner

METAL-ION BATTERY

CROSS REFERENCE TO RELATED APPLICATIONS

This non-provisional application claims the benefit under 35 U.S.C. § 119(e) to U.S. Provisional Application No. 62/337,629, filed on May 17, 2016, and under 35 U.S.C. § 119(a) to Patent Application No. 105140794, filed in Taiwan on Dec. 9, 2016, all of which are hereby expressly incorporated by reference into the present application.

TECHNICAL FIELD

The technical field relates to a metal-ion battery.

BACKGROUND

Aluminum is the most abundant metal on earth, and electronic devices made of aluminum have the advantage of costing little. An aluminum-based redox couple, which involves three electron transfers during electrochemical charge/discharge reactions, provides relatively high storage capacity. Additionally, because of its lower reactivity and flammability, such an aluminum-ion battery might offer significant safety improvements.

However, conditional metal-ion batteries exhibit low discharge voltage, low storage capacity, and ill-defined discharge voltage plateaus. Therefore, there is a need to develop a novel battery for solving the above problems.

SUMMARY

According to embodiments of the disclosure, the disclosure provides an energy storage device, such as metal-ion battery. The metal-ion battery includes a positive electrode; a negative electrode, wherein the negative electrode is a metal or an alloy thereof, the metal is Cu, Fe, Zn, Co, In, Ni, Sn, Cr, La, Y, Ti, Mn, or Mo; a separator, wherein the positive electrode is separated from the negative electrode by the separator; and an electrolyte, disposed between the positive electrode and the negative electrode. The electrolyte includes ionic liquid, aluminum halide.

A detailed description is given in the following embodiments with reference to the accompanying drawings.

DETAILED DESCRIPTION

Figure 1:
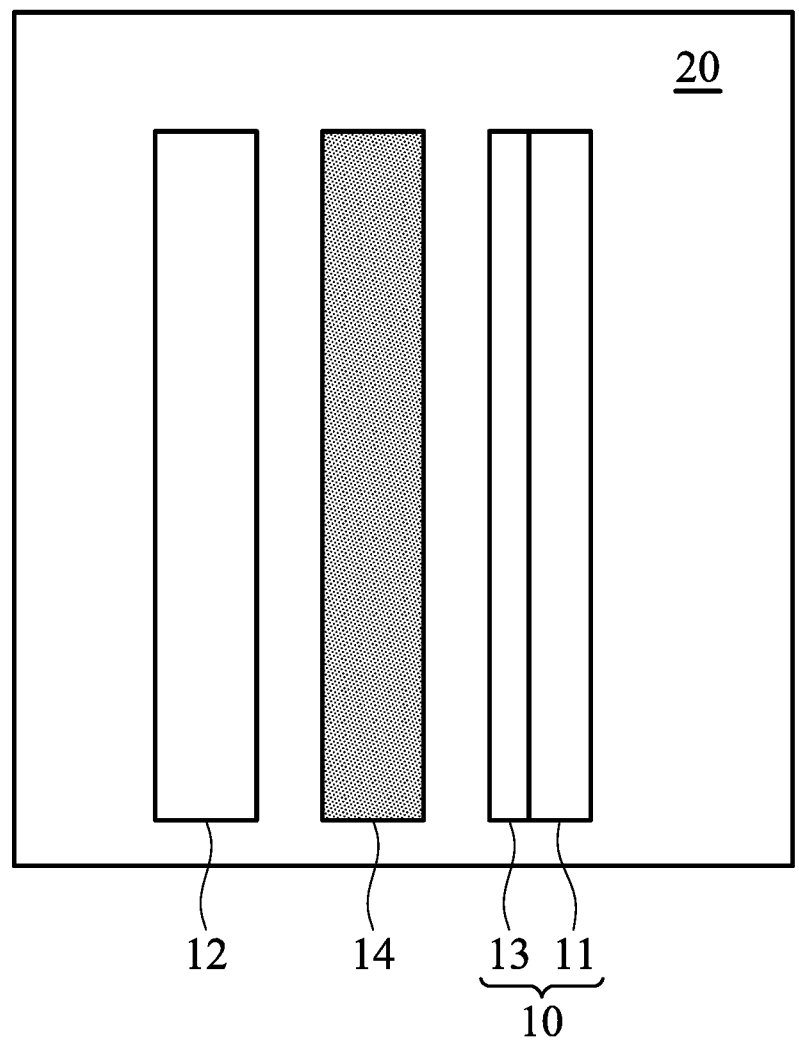
FIG. 1 is a schematic view of the metal-ion battery according to an embodiment of the disclosure.

In the following detailed description, for the purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

The disclosure provides a metal-ion battery. The metal-ion battery includes a positive electrode; a negative electrode, wherein the negative electrode is a metal or an alloy thereof, the metal is Cu, Fe, Zn, Co, In, Ni, Sn, Cr, La, Y, Ti, Mn, or Mo; a separator, wherein the positive electrode is separated from the negative electrode by the separator; and an electrolyte, disposed between the positive electrode and the negative electrode. The electrolyte includes ionic liquid, aluminum halide. According to embodiments of the disclosure, the negative electrode is a metal or an alloy thereof, wherein the metal of the negative electrode cannot include aluminum. The metal of the negative electrode and the halide anion of the electrolyte can form a metal halide, wherein the metal halide is able to serve as Lewis acid. Therefore, during the charging and discharging of the metal-ion battery, the metal dissolved from the negative electrode can react with the electrolyte to form a halometallate, and the aluminum halide in the electrolyte reacts with the ionic liquid to form a haloaluminate, resulting in that the electrolyte system is reversible. In addition, according to some embodiments of the disclosure, the halometallate can have a smaller ion size than that of the haloaluminate. Therefore, the haloaluminate may be more apt to intercalate into the active material (such as a graphite), or force the haloaluminate to intercalate into the active material, thereby enhancing the total capacity and extending the life of the metal-ion battery.

FIG. 1 is a schematic view of the metal-ion battery according to an embodiment of the disclosure. As shown in FIG. 1, the metal-ion battery 100 can include a positive electrode 10, a negative electrode 12, and a separator 14, wherein the separator 14 can be disposed between the positive electrode 10 and the negative electrode 12. The separator 14 can mitigate against electrical shorting of the positive electrode 10 and the negative electrode 12. The metal-ion battery 100 can include an electrolyte 20 disposed in the metal-ion battery 100, and between the positive electrode and the negative electrode, and contacting the positive electrode 10 and negative electrode 12. The metal-ion battery 100 can be a rechargeable secondary battery, although primary batteries also are encompassed by the disclosure.

According to embodiments of the disclosure, the positive electrode 10 can include a current-collecting layer 11 and an active material 13 disposed on the current-collecting layer 11. According to embodiments of the disclosure, the positive electrode 10 can consist of the current-collecting layer 11 and active material 13. According to embodiments of the disclosure, the current-collecting layer 11 can be a conductive carbon substrate, such as carbon cloth, carbon felt, or carbon paper. For example, the conductive carbon substrate can have a sheet resistance from about 1 m cm$^2$ to 6 m cm$^2$ and a carbon content of greater than 65 wt %. The active material 13 can include a layered active layer or an agglomeration of the layered active layer. According to embodiments of the disclosure, the active material 13 can be an intercalated carbon material, such as graphite (including natural graphite, artificial graphite, mesophase carbon microbeads, pyrolytic graphite, foaming graphite, flake graphite, or expanded graphite), graphene, carbon nanotube or a combination thereof. According to embodiments of the disclosure, the active material 13 can be layered double hydroxide, layered oxide, layered chalcogenide or a combination thereof. The active layer 13 can have a porosity between about 0.05 and 0.95, such as between about 0.3 and 0.9. The active material 13 can grow directly on the current-collecting layer 11 (i.e. there is no other layer between the active layer and the current-collecting layer). Furthermore, the active material 13 can be affixed to the current-collecting layer 11 via an adhesive.

According to embodiments of the disclosure, the material of the separator 14 can be glass fiber, polyethylene (PE), polypropylene (PP), nonwoven fabric, wood fiber, polyether sulfones (PES), ceramic fiber or a combination thereof.

According to embodiments of the disclosure, the negative electrode 12 can be a metal or an alloy of the metal, the metal of the negative electrode and the halide anion of the electrolyte can form a metal halide, wherein the metal halide is Lewis acid, resulting in that the electrolyte system is reversible. According to embodiments of the disclosure, the metal (M) can include Cu, Fe, Zn, Co, In, Ni, Sn, Cr, La, Y, Ti, Mn, or Mo. In addition, when the negative electrode 12 is an alloy of the metal M, the alloy containing the metal M does not contain aluminum. According to embodiments of the disclosure, the negative electrode 12 can further includes a current-collecting layer (Not shown in Fig.). Furthermore, the negative electrode 12 can consist of the current-collecting layer and the metal or the alloy of the metal (disposed on the current-collecting layer). According to embodiments of the disclosure, the metal or the alloy of the metal 12 can grow directly on the current-collecting layer 11 (i.e. there is no other layer between the metal and the current-collecting layer or there is no other layer between the alloy of the metal and the current-collecting layer). Furthermore, the metal or the alloy of the metal 12 can be affixed to the current-collecting layer 11 via an adhesive. According to embodiments of the disclosure, the metal M may be a metal having a reduced potential less than that of aluminum to improve the corrosion of the negative electrode of the metal ion battery.

According to embodiments of the disclosure, the electrolyte 20 can include an ionic liquid, aluminum halide. The ionic liquid can have a melting point less than 100° C. For example, the ionic liquid can be a room temperature ionic liquid (RTIL). According to embodiments of the disclosure, the ionic liquid can include urea, N-methylurea, choline chloride, ethylchlorine chloride, alkali halide, dimethyl sulfoxide, methylsulfonylmethane, alkylimidazolium salt, alkylpyridinium salt, alkylfluoropyrazolium salt, alkyltriazolium salt, aralkylammonium salt, alkylalkoxyammonium salt, aralkylphosphonium salt, aralkylsulfonium salt, or a combination thereof. The molar ratio of the aluminum halide to the ionic liquid can be at least about 1.1 or at least about 1.2, such as between about 1.1 and 2.1, about 1.1, about 1.3, about 1.5, about 1.6 or about 1.8. According to embodiments of the disclosure, when the aluminum halide is aluminum chloride and the ionic liquid can be 1-ethyl-3-methylimidazolium chloride, the molar ratio of the aluminum chloride to the 1-ethyl-3-methylimidazolium chloride can be at least about 1.2, such as between about 1.2 and 1.8. According to embodiments of the disclosure, the electrolyte can further include a dopant or an additive to increase electrical conductivity and lower the viscosity or the electrolyte can be modified in other ways to obtain a composition that facilitates reversible electrodeposition of the metal.

According to embodiments of the disclosure, the electrolyte 20 can further include another metal (M2) halide which is not aluminum halide, wherein the metal (M2) can include Cu, Fe, Zn, Co, In, Ni, Sn, Cr, La, Y, Ti, Mn, or Mo, or a combination thereof. The metal (M2) halide can comprises a metal fluoride, metal chloride, metal bromide, or a combination thereof and the metal halide is able to serve as Lewis acid.

According to embodiments of the disclosure, the ionic liquid can be a salt having a halide ion, during the charging and discharging of the metal-ion battery, the aluminum halide and ionic liquid can be formed a haloaluminate, for example, chloroaluminate $[AlCl_4]^-$. In addition, after the metal-ion battery is charged and discharged, the metal of the negative electrode reacts with the electrolyte to form a halometallate.

According to embodiments of the disclosure, the metal of the negative electrode, wherein the metal includes Cu, Fe, Zn, Co, In, Ni, Sn, Cr, La, Y, Ti, Mn, or Mo and the aluminum halide can be aluminum chloride. In this way, the chloridemetallate ($MCl_{(x+1)}^-$, x is an integer of 1 to 4) can be formed after charging and discharging of the metal-ion battery, for example, $CuCl_2^-$, $CuCl_3^-$, $FeCl_3^-$, $FeCl_4^-$, $MnCl_3^-$, $MnCl_4^-$, $LaCl_4^-$, $YCl_4^-$, $MoCl_4^-$, $ZnCl_3^-$, $NiCl_3^-$, $CoCl_3^-$, $CoCl_4^-$, $CrCl_3^-$, or $CrCl_4^-$ .... As a result, the chloridemetallate having a relatively small size may be more apt to intercalate into the active material (such as a graphite), or force the chloroaluminate to intercalate into the active material, thereby enhancing the discharging voltage and the total capacity of the metal-ion battery.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

A copper foil (with a thickness of 0.025 mm) was cut to obtain a copper electrode. Next, a separator (two layers with trade No. Whatman GFA) was provided. Next, a graphite electrode (including an active layer disposed on a current-collecting substrate, wherein the current-collecting substrate was carbon fiber paper, and the active layer was expanded graphite (60.5 mg)) was provided. Next, the copper electrode (serving as the negative electrode), the separator, and the graphite electrode (serving as the positive electrode) were placed in sequence and sealed within an aluminum plastic pouch. Next, an electrolyte (including aluminum chloride ($AlCl_3$)/1-ethyl-3-methylimidazolium chloride ([EMIm]Cl), wherein the molar ratio of $AlCl_3$ to [EMIm]Cl was about 1.4:1) was injected into the aluminum plastic pouch, obtaining the metal-ion battery (1).

Figure 2:
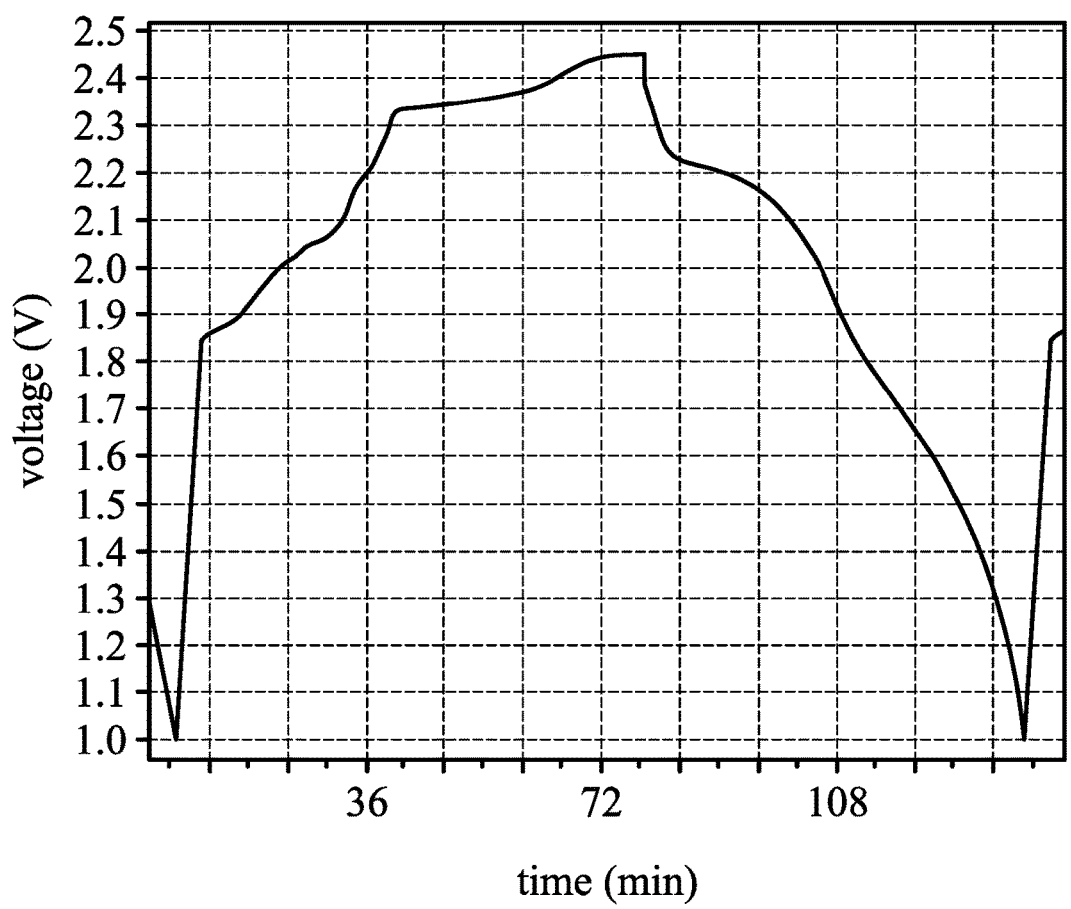
FIGS. 2-4 are graphs plotting voltage against time during the charging and discharging of the metal-ion batteries according to Examples or Comparative Example of the disclosure.

Next, the metal-ion battery (1) of Example 1 was charged (to about 2.45V) and discharged (to about 1V) at a current density of about 100 mA/g by a NEWARE battery analyzer to analyze the performance thereof. The maximum specific capacity of the metal-ion battery (1) is about 95.8 mAh/g. FIG. 2 is a graph plotting voltage against time during the charging and discharging of the metal-ion battery (1) of Example 1. As shown in FIG. 2, a plurality of charging platforms in a range from 1.8V to 2.45V were observed, In addition to 2.3V to 2.45V showed a significant charging platform, in from 2.0V to 2.1V and 1.8V to 1.9V also showed some charging platforms.

In addition, the metal-ion battery (1) was charged and discharged at a current density of about 500 mA/g, the specific capacity of the metal-ion battery (1) is about 87.43 mAh/g. As the use of copper as the negative electrode, the smaller ion size of the copper (II) chloride ($CuCl_3^-$) and Cuprous (I) chloride ($CuCl_2^-$) can be formed after charging and discharging, thereby enhancing the specific capacity of the metal-ion battery.

Example 2

A nickel foil (with a thickness of 0.03 mm) was cut to obtain a nickel electrode. Next, a separator (two layers with trade No. Whatman GFA) was provided. Next, a graphite electrode (including an active layer disposed on a current-collecting substrate, wherein the current-collecting substrate was carbon fiber paper, and the active layer was expanded graphite (72 mg)) was provided. Next, the nickel electrode (serving as the negative electrode), the separator, and the graphite electrode (serving as the positive electrode) were placed in sequence and sealed within an aluminum plastic pouch. Next, an electrolyte (including aluminum chloride ($AlCl_3$)/1-ethyl-3-methylimidazolium chloride ([EMIm]Cl), wherein the molar ratio of $AlCl_3$ to [EMIm]Cl was about 1.4:1) was injected into the aluminum plastic pouch, obtaining the metal-ion battery (2).

Figure 3:
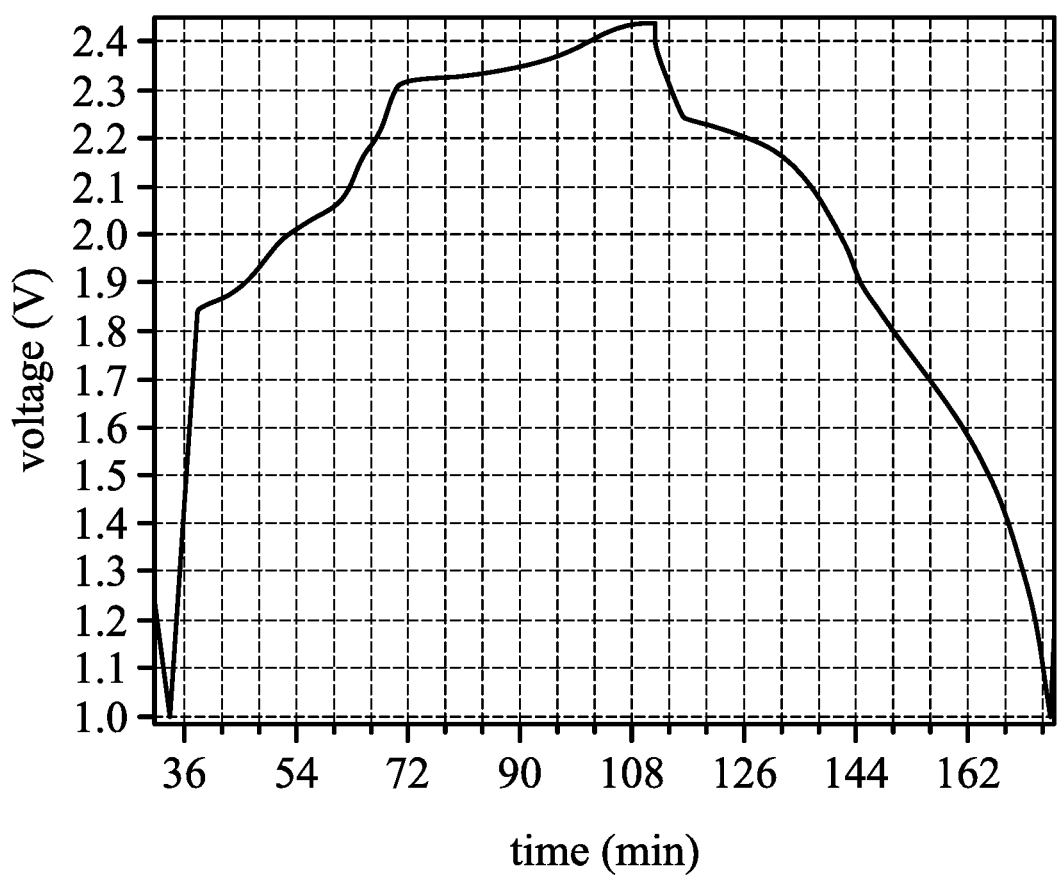

Next, the metal-ion battery (2) of Example 2 was charged (to about 2.45V) and discharged (to about 1V) at a current density of about 100 mA/g by a NEWARE battery analyzer to analyze the performance thereof. The maximum specific capacity of the metal-ion battery (2) is about 88 mAh/g, as shown in FIG. 3, a plurality of charging platforms in a range from 1.5V to 2.45V were observed, In addition to 2.3V to 2.45V showed a significant charging platform, in from 2.0V to 2.1V, 1.8V to 1.9V, 2.3V to 2.0V and 1.8V to 1.5V also showed some charging platforms.

After a plurality of charging and discharging cycles of the metal-ion battery (2), there is no perforation or breakage was observed of the nickel electrode (as the negative electrode). Therefore, the corrosion of the negative electrode can be quite a good improvement by using a nickel electrode as a negative electrode with aluminum chloride/chlorinated 1-ethyl-3-methyl imidazolium as electrolyte.

Example 3

A stainless steel foil (with a thickness of 0.1 mm, Nippon Steel, YUS190, composition of iron and chrome) was cut to obtain a stainless steel electrode. Next, a separator (two layers with trade No. Whatman GFA) was provided. Next, a graphite electrode (including an active layer disposed on a current-collecting substrate, wherein the current-collecting substrate was carbon fiber paper, and the active layer was expanded graphite (45 mg)) was provided. Next, the stainless steel electrode (serving as the negative electrode), the separator, and the graphite electrode (serving as the positive electrode) were placed in sequence and sealed within an aluminum plastic pouch. Next, an electrolyte (including aluminum chloride ($AlCl_3$)/1-ethyl-3-methylimidazolium chloride ([EMIm]Cl), wherein the molar ratio of $AlCl_3$ to [EMIm]Cl was about 1.4:1) was injected into the aluminum plastic pouch, obtaining the metal-ion battery (3).

Figure 4:
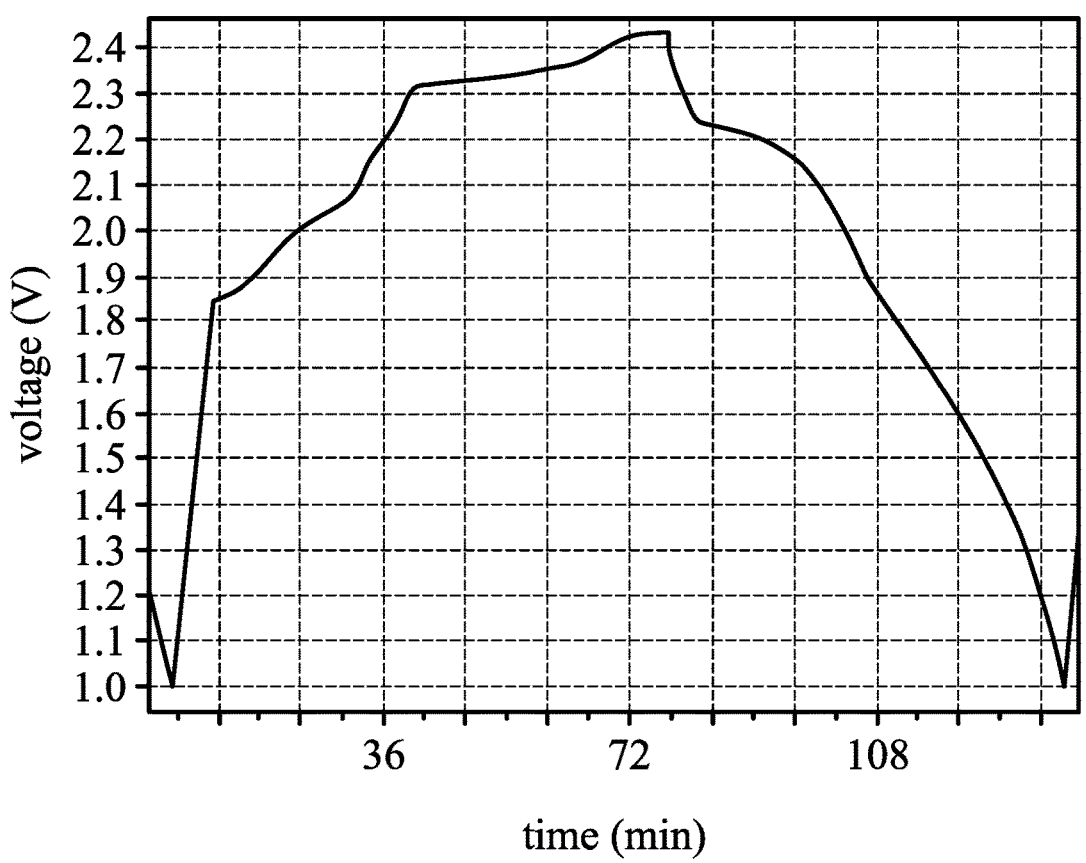

Next, the metal-ion battery (3) of Example 3 was charged (to about 2.45V) and discharged (to about 1V) at a current density of about 100 mA/g by a NEWARE battery analyzer to analyze the performance thereof. The maximum specific capacity of the metal-ion battery (3) is about 95.8 mAh/g, as shown in FIG. 4, a plurality of charging platforms in a range from 1.5V to 2.45V were observed, In addition to 2.3V to 2.45V showed a significant charging platform, in from 2.0V to 2.2V and 2.3V to 1.5V also showed some charging platforms. As the use of stainless steel (composition of iron and chrome) as the negative electrode, the smaller ion size of the Chromous (II) chloride ($CrCl_3^-$) and Ferrous (II) Chloride ($FeCl_3^-$) can be formed after charging and discharging, thereby enhancing the specific capacity of the metal-ion battery.

Comparative Example 1

An aluminum foil (with a thickness of 0.025 mm) was cut to obtain an aluminum electrode. Next, a separator (two layers with trade No. Whatman GFA) was provided. Next, a graphite electrode (including an active layer disposed on a current-collecting substrate, wherein the current-collecting substrate was carbon fiber paper, and the active layer was expanded graphite (57 mg)) was provided. Next, the aluminum electrode (serving as the negative electrode), the separator, and the graphite electrode (serving as the positive electrode) were placed in sequence and sealed within an aluminum plastic pouch. Next, an electrolyte (including aluminum chloride ($AlCl_3$) and 1-ethyl-3-methylimidazolium chloride ([EMIm]Cl), wherein the molar ratio of $AlCl_3$ to [EMIm]Cl was about 1.4:1) was injected into the aluminum plastic pouch, obtaining the metal-ion battery (4).

Next, the metal-ion battery (4) of Comparative Example 1 was charged (to about 2.45V) and discharged (to about 1.5V) at a current density of about 100 mA/g by a NEWARE battery analyzer to analyze the performance thereof. The maximum specific capacity of the metal-ion battery (4) is about 80.7 mAh/g.

As compared with Comparative Example 1, the metal-ion battery using the non-aluminum electrode as the negative electrode as described in Examples 1 and 3, since the charge and discharge, the negative electrode can react with the electrolyte to form a chloridemetallate ($MCl_{(x+1)}^-$) having a smaller ion size than the chloroaluminate $[AlCl_4]^-$, so it is easier to intercalate into graphite, or force the chloroaluminate to intercalate into graphite, thereby enhancing the capacity of the metal-ion battery. In addition, the metal ion battery using nickel as the negative electrode described in Example 2, since the nickel electrode is still free from corrosion after charging and discharging of the metal-ion battery (2). Therefore, the nickel electrode could increase the total capacity of the metal-ion battery and prolong the life of the metal-ion battery.

It will be clear that various modifications and variations can be made to the disclosed methods and materials. It is intended that the specification and examples be considered as exemplary only, with the true scope of the disclosure being indicated by the following claims and their equivalents.

What is claimed is:
1. A metal-ion battery, comprising:
a positive electrode;
a negative electrode, wherein the negative electrode is a metal or an alloy thereof, the metal is Cu, Cr, or Mn;
a separator, wherein the positive electrode is separated from the negative electrode by the separator; and
an electrolyte disposed between the positive electrode and the negative electrode, wherein the electrolyte includes ionic liquid, aluminum halide, and wherein the metal-ion battery exhibits a plurality of charging plateaus or discharging plateaus during the charging or discharging of the metal-ion battery.
2. The metal-ion battery as claimed in claim 1, wherein the positive electrode consists of a current-collecting layer and an active material.

3. The metal-ion battery as claimed in claim 2, wherein the current-collecting layer is conductive carbon substrate.

4. The metal-ion battery as claimed in claim 3, wherein the conductive carbon substrate is carbon cloth, carbon felt, or carbon paper.

5. The metal-ion battery as claimed in claim 2, wherein the active material is a layered active layer or an agglomeration of the layered active layer.

6. The metal-ion battery as claimed in claim 2, wherein the active material is graphite, carbon nanotube, graphene, or a combination thereof.

7. The metal-ion battery as claimed in claim 6, wherein the graphite is natural graphite, artificial graphite, mesophase carbon microbeads, pyrolytic graphite, foamed graphite, flake graphite, expanded graphite, or a combination thereof.

8. The metal-ion battery as claimed in claim 1, wherein the electrolyte further comprises a metal halide which is not aluminum halide.

9. The metal-ion battery as claimed in claim 8, wherein the metal halide comprises a metal fluoride, metal chloride, metal bromide, or a combination thereof.

10. The metal-ion battery as claimed in claim 8, wherein the metal halide is Lewis acid.

11. The metal-ion battery as claimed in claim 1, wherein the aluminum halide comprises aluminum fluoride, aluminum chloride, or aluminum bromide, or a combination thereof.

12. The metal-ion battery as claimed in claim 1, wherein the ionic liquid comprises urea, N-methylurea, choline chloride, ethylchlorine chloride, alkali halide, dimethyl sulfoxide, methylsulfonylmethane, alkylimidazolium salt, alkylpyridinium salt, alkylfluoropyrazolium salt, alkyltriazolium salt, aralkylammonium salt, alkylalkoxyammonium salt, aralkylphosphonium salt, aralkylsulfonium salt, or a combination thereof.

13. The metal-ion battery as claimed in claim 12, wherein the ionic liquid is 1-ethyl-3-methylimidazolium chloride.

14. The metal-ion battery as claimed in claim 1, wherein the aluminum halide reacts with the ionic liquid to form a haloaluminate, after charging and discharging of the metal-ion battery.

15. The metal-ion battery as claimed in claim 14, wherein the metal of the negative electrode reacts with the electrolyte to form a halometallate, after charging and discharging of the metal-ion battery.

16. The metal-ion battery as claimed in claim 15, wherein the ion size of an anion of the halometallate is less than the ion size of an anion of the haloaluminate.

* * * * *